Dec. 13, 1949 C. W. LOZINSKI 2,491,121
VARIABLE TRANSMISSION
Filed Oct. 25, 1946 3 Sheets-Sheet 1

Cezary W. Lozinski,
INVENTOR.

BY
his AGENT.

Dec. 13, 1949 — C. W. LOZINSKI — 2,491,121
VARIABLE TRANSMISSION
Filed Oct. 25, 1946 — 3 Sheets-Sheet 2

Cezary W. Lozinski,
INVENTOR.

BY
His AGENT.

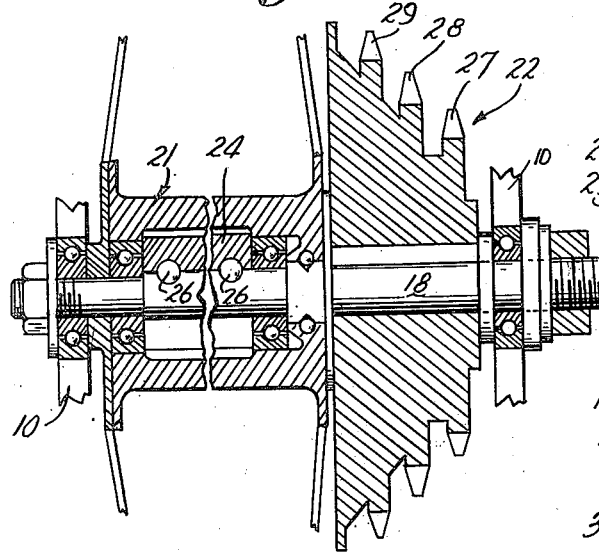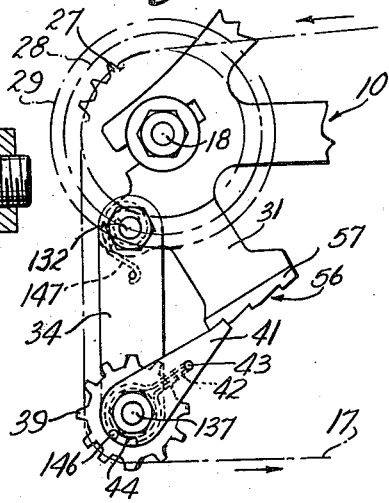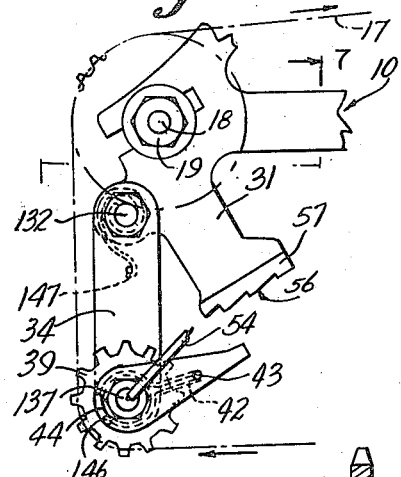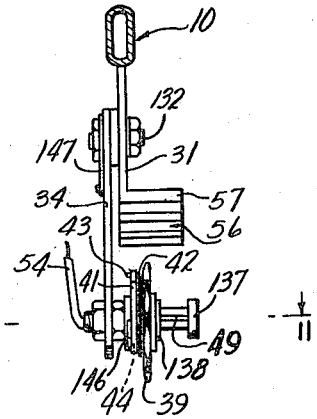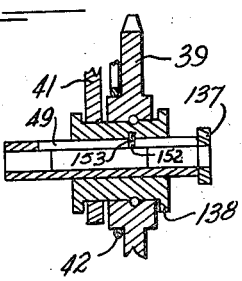

Patented Dec. 13, 1949

2,491,121

UNITED STATES PATENT OFFICE 2,491,121

VARIABLE TRANSMISSION

Cezary W. Lozinski, New Britain, Conn.

Application October 25, 1946, Serial No. 705,712

12 Claims. (Cl. 74—217)

1

The present invention relates to variable transmissions and relates more particularly to variable speed mechanisms for bicycles.

Desirable features for variable speed mechanisms for bicycle propulsion include simplicity, lightness, strength, and ease of maintenance, and these features are generally obtained, within practical limitations, on bicycles now in use. However, variable speed ratio mechanisms now in use with coaster brake type propulsion are deficient in dependability. More particularly, the type of gear ratio varying mechanisms making use of chain propulsion with multi-step driven gears are widely used with good results, providing the chain propulsion mechanism is not used for the transmission of the braking force through pedalling in reverse. Namely, the use of a multi-step gear requires the driving chain to have its lower span tensioned by an idler mounted on a spring loaded lever, to compensate for the variations of the diameters of the steps of driven gears.

Where the chain is used only to transmit propulsion energy for the bicycle, this arrangement operates efficiently, but when the chain is also used to transmit brake energy to the rear hub, this arrangement may cause a complete breakdown resulting in putting the bicycle out of control. This is brought about by the reversal of chain drive direction in transmitting brake energy, whereby the lower span, instead of idling, assumes the function of transmitting the braking force and will be tensioned considerably in excess of the force of the spring tensioning the idler lever. The idler lever will be moved by that force against its spring impulse and thus the effective length of the upper span will be increased which will cause a delay of the braking action and may result in complete derailment of the chain if the braking action is imparted to it sufficiently rapidly.

It is, therefore, one of the principal objects of my invention to provide a variable speed mechanism which is operable with a high degree of safety and dependability at all times.

A further object of my invention is the provision of a variable speed transmission chain drive wherein the chain will be tensioned throughout any driving movement thereof.

A further object of my invention is to provide a multiple speed ratio drive for bicycles which may safely be used for propulsion and braking actions.

A still further object of my invention is the provision of a chain transmission, wherein the chain will be resiliently tensioned when driven in one direction and substantially rigidly tensioned when driven in an opposite direction.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, certain embodiments of the same being illustrated in the accompanying drawings and described in the specification.

In the accompanying drawings,

Fig. 5 is an elevational fragmentary view similar to Fig. 2, but embodying a modification;

Fig. 6 is an elevational fragmentary view of the modification shown in Fig. 5 with certain elements illustrated in different position;

Fig. 7 is a sectional view taken along line 7—7 of Fig. 6;

Fig. 8 is a fragmentary sectional view through a modified hub;

Fig. 11 is a sectional view taken along line 11—11 of Fig. 7.

Figure 1:
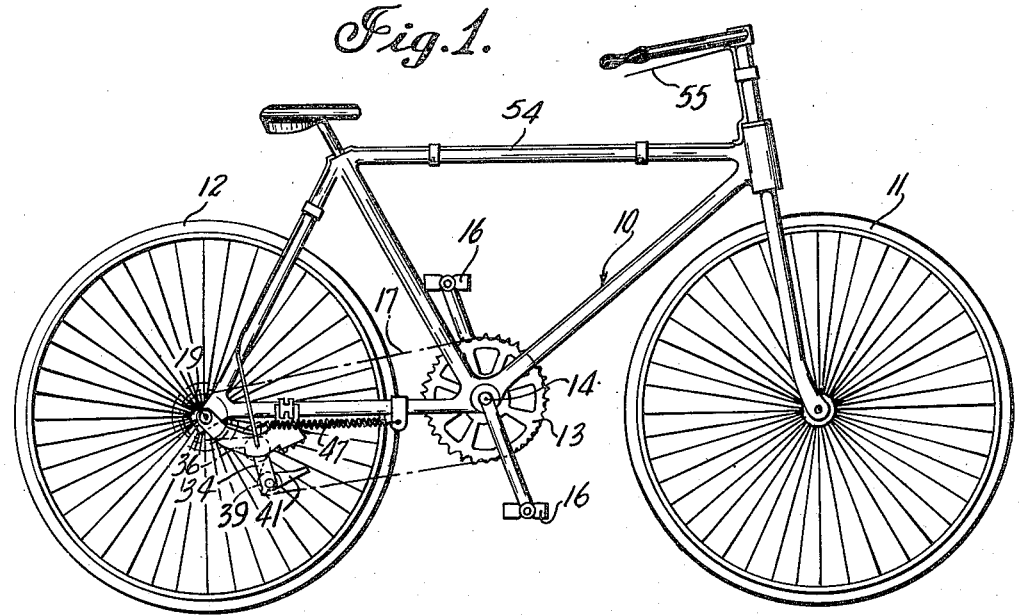
Fig. 1 is an elevational view of a bicycle and a transmission drive thereon, in accordance with my invention.

In carrying the invention into effect in the embodiments which I have selected for illustration in the accompanying drawings and for description in this specification, and referring now particularly to Fig. 1, I provide a bicycle frame generally designated 10, a front wheel 11 and a rear wheel 12, each wheel pivotally connected to said frame. A driving gear 13, consisting of a sprocket wheel, is mounted to said frame 10 at 14 between the front and the rear wheels. A pair of pedals 16 is rigidly secured to a crank which in turn is connected to said driving gear 13, for actuation thereof by the bicycle operator.

An endless roller chain 17 is engaged by said driving gear 13 and may be driven in opposite directions thereby, as will be explained further below.

A shaft 18 is rotatably mounted at 19 to the rear portion of said frame 10, and a hub 21 of said rear wheel 12 surrounds said shaft 18. Said shaft 18 carries a multiple gear generally designated 22 for driving said shaft.

Figure 3:
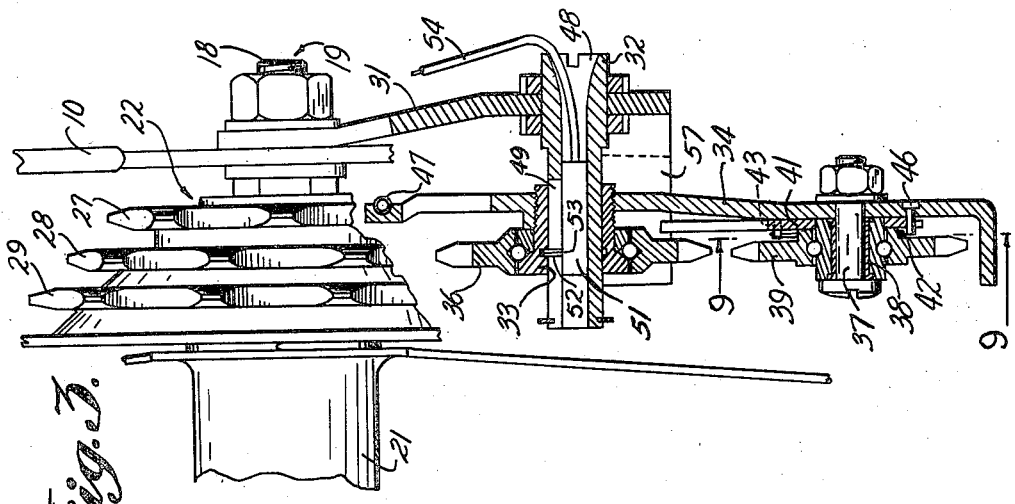
Fig. 3 is a sectional view taken along line 3—3 of Fig. 2.

Said gear, shaft and hub assembly may be of any one of the three types most generally in use:

(a) With driven gears rigidly mounted sidewards to the hub, illustrated most clearly in Fig. 3, but not shown in detail, since it is well known in the art.

(b) With driven gears mounted rotatably to turn the hub in forward direction only on a so-called free wheeling bearing at one side of the hub, which is best shown in Fig. 8 where, however, additional features are also illustrated.

The free wheeling hub permits the hub and the wheel to coast in the forward direction when the driving and driven gears are at a stand-still or are even rotating in reverse.

(c) With driven gear mounted rotatably to turn the hub in forward direction only, at one side of the coaster-brake hub as shown in Fig. 8.

The coaster-brake hub permits the hub and wheel to coast in the forward direction with driving and driven gears at a stand-still. If, however, said gears are rotated in reverse by back-pedalling action, the braking mechanism inside the hub comes into action, slowing and finally checking the coasting forward movement.

In the following the invention will be described in connection with a coaster brake mechanism, but it should be kept in mind that the invention is not limited thereto and is equally well usable with any of the other drives mentioned.

I provide a brake mechanism of conventional type which comprises a split tubular brake member 24 within said hub, surrounding said shaft 18 and normally out of contact with the interior wall of said hub. Several spacers 26 are placed between said split tubular member 24 and said shaft 18 and operable by the latter in a manner similar to the operation of a unidirectional free wheel drive. When the shaft is turned in one direction (the propelling direction of the bicycle, whereby the hub is rotated), the position of said tubular member 24 will remain unchanged. However, when said shaft is rotated in an opposite direction, said spacers 26 will be pressed between the shaft and the tubular member and will cause the latter to expand radially, and frictionally to engage the interior of the wall of said hub 22; thereby a braking action takes place and any rotational movement of said hub and therewith of said rear wheel 12 will be slowed and brought to a standstill.

The multiple gear 22 may consist of several integral steps which are cylindrical and coaxial with said shaft, each step differing in diameter from the adjacent steps and each provided with a plurality of spaced sprockets, so that each step may selectively be engaged by said chain 17 for driving said shaft. Instead of having these steps integral with said multiple gear, said multiple gear 22 may preferably consist of a plurality of separate gears 27, 28 and 29, which are rigidly secured to each other, so that they will rotate together when any one of them is driven.

When said chain engages the largest gear 27 of these tied gears, the bicycle will be geared for speed. When said chain 17 engages the smallest gear 29, the bicycle will be geared for power. It will be understood that more than three steps or single gears may be provided, but usually the provision of variation among three speed ratios is sufficient for conventional commercial bicycles.

Since said chain 17 must be able to engage the largest gear 29 at some times, as well as the smallest gear 27 of said multiple gear at other times, the chain 17 has to be large enough to accommodate the large diameter gear 29 and, consequently, would normally have a great amount of slack when slung around the small diameter gear 27. In order to avoid such a slack, the chain is made longer than needed even for the large gear 29, and a tensioning device is applied against the chain to take up that slack.

Figure 2:
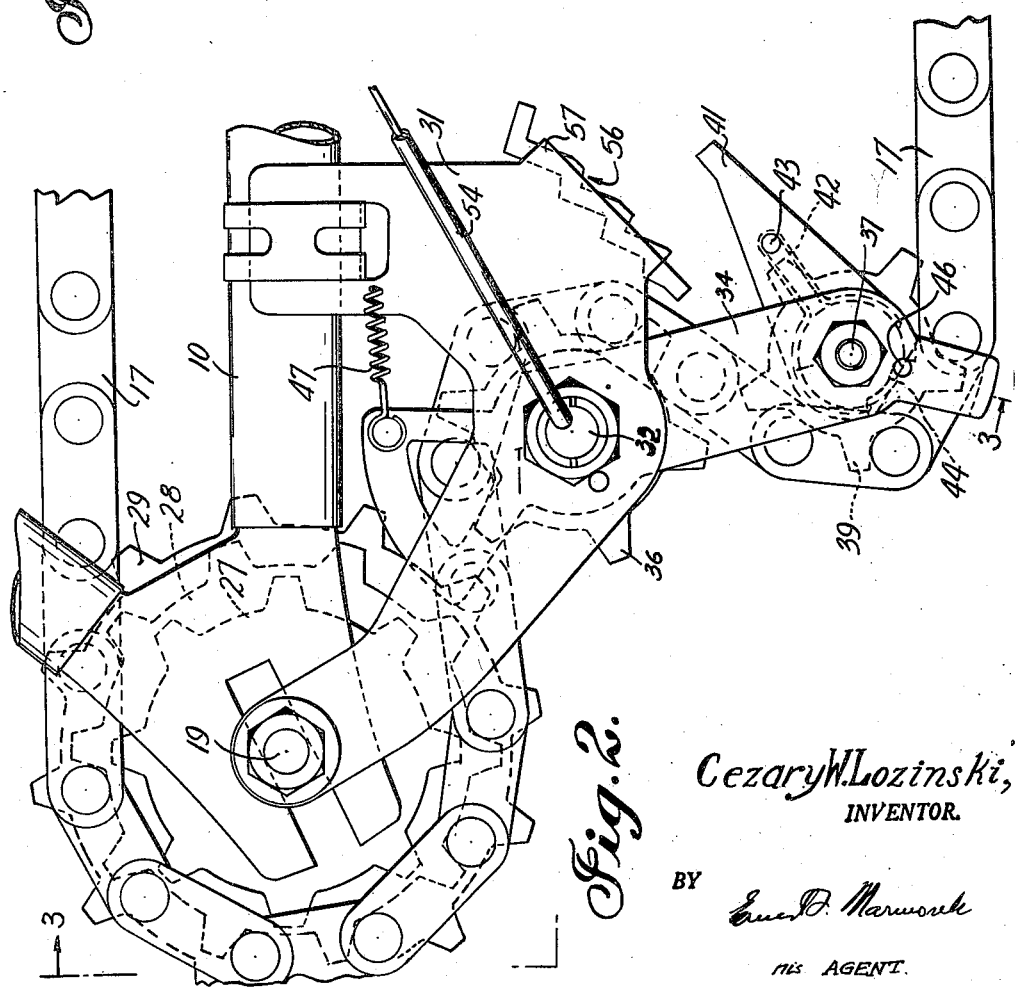
Fig. 2 is a fragmentary enlarged elevational view of the rear portion of the bicycle shown in Fig. 1.

As most clearly shown in Figs. 2 and 3, I provide a projection 31 which is rigidly mounted on said frame 10 and carries a pivot or shaft 32 which extends inwardly therefrom. A sleeve is rotatably and slidably mounted on said shaft 32 and carries a lever 34 which is rigidly secured to said sleeve 33 by means of a threaded engagement and swingable with the sleeve and an idler gear 36 which is freely rotatable on said sleeve and located adjacent said lever 34; said idler gear 36 and said lever 34 are shiftable sidewardly by a sideward sliding movement of said sleeve 33.

Said lever 34 extends downwardly and carries near its lower end a pivot 37. A bushing 38 is mounted on said pivot 37 which carries a second idler gear 39 which is freely rotatable on said bushing and is in alignment with said first idler gear 36. Adjacent said second idler gear 39 a pawl 41 is mounted on said bushing 38. A spring clip 42 surrounds a portion of the hub of said second idler gear 39 and is disposed between said gear 39 and said pawl 41, and has a pin-shaped portion 43 which transversally protrudes through said pawl 41. Said pawl 41 has a recess 44 into which protrudes a pin 46 which is secured to said lever 34, for limiting the rotational movement of said pawl between two extreme positions.

As will be readily seen, by moving said sleeve 33 on said pivot 32, the lever 34 as well as both aligned idler gears will be shifted sideways therewith to be aligned with one of said steps 27, 28 or 29, respectively, of said multiple gear 22.

By said sideward shifting movement said chain 17 will be switched among the steps of said multiple gear for varying the speed ratio, as described in the foregoing. Said lever 34 extends upwardly from said pivot 32 and carries on its upper end one end of a coiled spring 47 which is secured with its other end to said frame 10 (see Fig. 1). Thereby, the lower end of said lever 34 will resiliently be pressed rearwardly and, with the aid of said second idler gear 39 will keep the lower span of the chain 17 under tension.

In order to bring about the sideward shifting of said sleeve 33 and therewith of said aligned idler gears 36 and 39 for the purpose of switching the chain among the steps of the multiple gear, I provide within said pivot 32 a central bore 48 and a slot 49 communicating interiorly with said bore 48. A shifting member 51 is slidingly mounted in said bore 48 and carries a pin 52 which extends through said slot 49 into a circular groove 53 of said sleeve 33, whereby the latter is guided in its shifting movement. A flexible cable 54 is attached with one of its ends to said member 5f and extends from there upwardly and is strung along the contour of the frame 10 to a suitable point near the bicycle handle and is attached there to a control lever 55 which is within easy reach of one hand of the operator.

When said sleeve 33 and the parts carried thereby are shifted by the control lever 55 and the means controlled thereby into any new position opposite one of the steps of the driven gear 22, the chain 17 follows the shifting motion and is caused to climb up or down to a step which happens to be in line with the new position of the idlers 36 and 39.

The lever 34 is thereby caused to swing in or out, as required, to compensate for the new length of the lower span of the chain which is released or absorbed by the change in diameter of the driven gear step.

Thus, during normal propulsion of the bicycle, the driving gear 13 will be rotated by the pedals 16 in clockwise direction (Fig. 1) and the chain be driven clockwise, and the upper span thereof will be tensioned and transmit energy to the driven multiple gear 22; during this forward drive the lower span transmits no energy, but is idle and kept under tension only by means of the idler gear 39 which is resiliently held in place by means of the lever 34 and the spring 47.

When the driving arrangement is utilized also for a braking action, the operator may slow the movement of the rear wheel 12 by reversing the direction of pedalling, thus turning the driving gear 13 for a certain angular move in an opposite direction, counter clockwise with respect to Fig. 1. By this move, the chain will also be driven in a counter clockwise direction and the driven multiple gear 22 so turned and thus the braking action brought about by the braking arrangement described in the foregoing or by any known conventional arrangement of the coaster brake type. However, the lower span of the chain assumes now the function of transmitting the energy from the driving gear and consequently is considerably tensioned thereby, whereas the upper span of the chain idles now. By this forced tension of the lower chain span, pressure will be exerted against the idler gear 39 held in position by the relatively weak impulse of the spring 47 and the idler gear 39 will yield to this pressure, whereby the effective length of the upper span is increased up to a distance equal to that of the portion of the chain between the two idlers 36 and 39. This increase in effective length of the upper span will result in a slack of the upper idling span which will sag for a certain distance. Thereby, the braking action will be delayed considerably and, if the braking action is initiated rapidly, the sagging of the upper span may cause the chain to be disengaged from one of the gears due to the absence of tension throughout the entire chain, but instead prevailing only in the lower span; thus a failure of the braking mechanism may be caused and the consequent loss of control of the bicycle.

In order to prevent this dangerous failure and to perfect the driving mechanism so that it will be completely safe, I provide means which will be actuated to maintain substantially the original length of the lower span upon reversal of direction of chain movement. This is accomplished by latching the idler lever 34 substantially in its position held during the forward drive with a resulting substantially rigid tensioning of the chain during the reverse movement instead of resiliently tensioning it as is the case during the forward movement of the bicycle.

Figure 10:
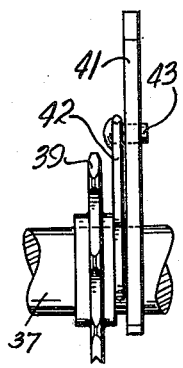
Fig. 10 is a fragmentary side view on the same scale as Fig. 9.
Figure 9:
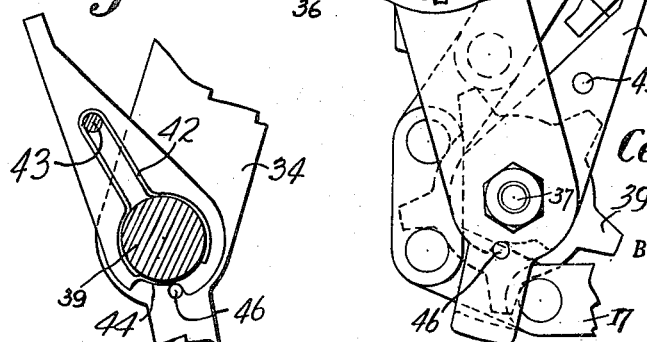
Fig. 9 is a sectional view taken along line 9—9 of Fig. 3, showing on an enlarged scale a pawl and spring clip arrangement.

As described in the foregoing, the lower or second idler gear 39 is mounted on a bushing 38 which, in turn, is carried by the pivot 37, the latter being secured to the lower end of the lever 34. Said bushing 38 furthermore carries a pawl 41, and a spring clip surrounds a portion of the hub of said lower idler gear 39 and is in frictional engagement therewith. By said frictional engagement the spring clip will follow the rotational movement in either direction of said lower idler gear 39 and, since a portion 43 of said spring clip protrudes into said pawl 41, the pawl will follow within the limits of its extreme positions the movement of the idler gear 39 in either direction, when the same is rotated. This is best shown in Figs. 9 and 10.

As shown in Fig. 2, when the bicycle is driven forwardly, the idler gear 39 will be rotated clockwise and the pawl 41, owing to its frictional interengagement with relation to the idler gear, will move clockwise until it is brought to a stop in an extreme position by said pin 46 and will maintain the position of rest shown in Fig. 2.

Figure 4:
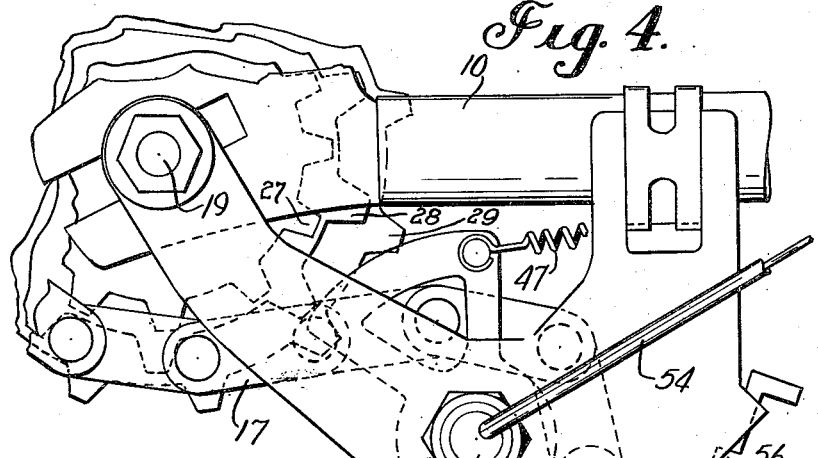
Fig. 4 is an elevational fragmentary view similar to Fig. 2, but showing certain parts in different position.

However, upon initiating of the braking action, the chain 17 will be driven in an opposite direction and consequently the idler gear 39 will rotate counter clockwise and cause the pawl 41 to rotate counter clockwise, until, as illustrated in Fig. 4, it comes into latching engagement with one of three spaced notches generally designated 56 and disposed on an extension 57; this extension 57 is connected to said projection 31 which, in turn, is secured to or even may be integral with said frame 10, as shown in Fig. 5. By this latching engagement, the idler gear 39 and the lever 34 are halted in their yielding movement to the pressure of the forcibly tensioned lower span and, accordingly, the entire chain will be substantially rigidly tensioned, the spring 47 being rendered temporarily ineffective by that latching engagement.

After cessation of the braking movement and resumption of the propelling movement, the idler gear 39 will again be driven clockwise, the lower span of the chain be idling again, and the clip 42 will turn the pawl into the rest position shown in Fig. 2.

When the pawl 41 is moved towards engagement with one of said notches 56, as shown most clearly in Fig. 4, it will engage a particular notch depending on which of said driven gears 27, 28 or 29 presently engages the chain 17. The diameter of the engaged driven gear controls the available length of the chain spans and, consequently, when the driven gear of smallest diameter is engaged by the chain, the rearwardmost notch will be engaged by the pawl, and when the driven gear of largest diameter is operated, the forwardmost notch will be engaged by the pawl 41.

It will be understood that for each driven gear a notch must be provided on the extension 57, and since in the embodiments which I have shown for illustration the multiple gear 22 consists of three parts of different diameter, there are three notches 56 provided.

Since the pawl 41 is laterally shiftable together with the lower idler gear 39, said extension 57 having said notches 56 extends laterally for a distance substantially equal to that of the pivot 32 on which the sleeve 33 moves carrying the upper idler gear 36 and the lever 34.

An arrangement similar to that described in the foregoing is shown in the modification illustrated in Figs. 5, 6, 7 and 8. The differences consist in the omission of the upper idler gear 36 and the substitution of the coiled spring 47 by a spiral spring 147 which bears against the lever 34 supporting the idler gear 39. Furthermore, the lever 34 is swingably mounted on the pivot 132, but is not shiftable thereon in this modification. The cable 54 connects to the pivot 137 where the shifting is carried out similarly to that of the pivot 32 of the previous views. Since the lever 34 is stationary with respect to sideward movement, the pin 146 limiting the rotation of the pawl 41 is here not secured to the lever 34 but to the bushing 138, the latter being shiftable but not rotatable on the pivot 137, the check against rotation being accomplished by the pin and socket arrangement 152 and 153, at variance with the pin and groove arrangement shown in Fig. 3 and described hereinbefore. The chain 17 in this modification is slung around the driving gear, the multiple gear 22 and the idler gear 39. Otherwise, similar parts to those in the foregoing are used and the operation is also similar thereto.

The operation of the above described embodiments of my invention as follows:

During the normal propulsion of the bicycle, the idler gear 39 will resiliently hold the chain 17 under tension by pressing thereagainst rearwardly from the inside under the impulse of the spring 47 (147). In order to shift the speed ratio of the driving mechanism, the operator may shift the idler gear or gears into a position in line with the desired step of the multiple gear 22, and if such shifting is from power towards speed, the spring will be moderately tensioned due to the diminished available length of the lower span and a consequent forwardly directed pressure against the idler gear 39 and the lever 34.

When the direction of driving of the chain 17 is reversed, the idler gear 39 will cause the pawl 41 to move towards and into latching engagement with one of said notches 56, whereby the chain will be tensioned substantially rigidly throughout its entire length and the braking action will be effective immediately and without the possibility of derailment of the chain from its engagement with the various gears. Thus, the braking action will be safe and dependable.

Certain of the advantages of the invention have already been herein referred to. It may be useful, however, to allude at this point to the safety factor which is brought about by my invention. Since a rapid braking action is usually initiated only during sudden emergency, an absolute dependability of the mechanism is of great importance to save the operator of the bicycle from possible danger.

I do not limit myself to the particular details of construction set forth in the foregoing specification and illustrated in the accompanying drawings, as the same refer to and set forth only certain embodiments of the invention and it is obvious that the same may be modified, within the scope of the appended claims, without departing from the spirit and scope of the invention.

Having thus described the invention, what I claim as new and desire to be secured by Letters Patent, is as follows:

1. In a variable speed mechanism, the combination with a frame, a driving gear rotatably mounted thereon, an endless flexible chain operable to be driven thereby in opposite directions, a movable hub for an impelling wheel rotatably mounted on said frame and including coaster brake means, and driven means operatively connected with said hub and adapted to be driven in opposite directions for rotating said impelling wheel in one direction when driven in one direction and slowing a movement of said impelling wheel when driven in an opposite direction, of a plurality of gears of different diameter rigidly connected to said driven means and selectively engageable by said chain for driving said impelling wheel at variable ratios with relation from said driving gear, spring means for tensioning said chain throughout when the same is driven in either direction and latching means for cooperating with said spring means to maintain said chain tensioned substantially rigidly and adapted to be actuated by said chain when said gears are driven in said opposite direction and to be released by said chain when said gears are driven in said one direction.

2. In a variable speed mechanism for bicycles, the combination with a bicycle frame, a foot operated driving gear mounted thereon, a flexible power transmitter operable to be driven thereby in opposite directions, and a hub for a propelling wheel mounted rotatably on said frame and including coaster brake means, of a gear adapted to be driven by said transmitter and connected with relation to said hub, arranged to turn the same for impelling said bicycle, spring means connected with relation to said frame for resiliently tensioning said transmitter when the same is driven in one direction and releasable latching means arranged to cooperate with said first spring means for substantially rigidly tensioning said transmitter when the same is driven in an opposite direction and operable by said transmitter to be actuated for latching and for release.

3. In a variable speed mechanism for bicycles, the combination with a bicycle frame, a foot operated driving gear mounted thereon, an endless flexible power transmitter operable to be driven thereby in opposite directions, and a movable hub for a propelling wheel mounted on said frame and including coaster brake means, of a multiple gear adapted to be driven by said transmitter and connected with relation to said hub, arranged to turn the same in one direction to propel the bicycle at selectable variable speed ratios when said transmitter is driven in one direction and to actuate said coaster brake means when said transmitter is driven in an opposite direction, and means connected with relation to said frame and so arranged as to tension said transmitter sufficiently to maintain said transmitter in positive driving engagement with said gears when the transmitter is driven in either direction, said means including permanently acting power means and releasable latching means operable by said transmitter for aiding said spring means to maintain said transmitter tensioned when the latter is driven in an opposite direction to brake the hub movement speed.

4. In a variable speed mechanism for bicycles, the combination with a bicycle frame, a foot operated driving gear mounted thereon, an endless flexible power transmitter operable to be driven thereby in opposite directions, and a movable hub for a propelling wheel mounted on said frame and including coaster brake means, of a multiple gear adapted to be driven by said transmitter and connected with relation to said hub, said multiple gear comprising a plurality of adjacent cylindrical steps arranged to turn said hub in one direction to propel the bicycle at selectable variable speed ratios when said transmitter is driven in one direction and to actuate said coaster brake means when said transmitter is driven in an opposite direction, spring controlled means for resiliently tensioning said transmitter when the same is driven in said one direction, and a latch associated with said means adapted to be actuated with relation by said transmitter when the latter is moved in said opposite direction, whereby said means will be maintained in position to tension said transmitter.

5. In a variable speed mechanism for bicycles, the combination with a bicycle including a frame, a foot operated driving sprocket wheel thereon, an endless chain operable to be driven thereby in opposite directions, and a movable hub for a propelling wheel rotatably mounted on said frame and including coaster brake means, of a multiple gear adapted to be driven by said transmitter and connected with relation to said hub comprising a plurality of adjacent cylindrical steps, each step carrying on its exterior spaced sprockets for operatively engaging said chain when the latter is placed on a step, said multiple gear arranged to turn said hub in one direction to propel the bicycle at selectable variable speed ratios when said transmitter is driven in one direction and to actuate said coaster brake means when said transmitter is driven in an opposite direction, a spring pressed movable lever pivotally connected to said frame, an idler sprocket wheel rotatable on said lever and adapted resiliently to tension said chain when it is driven in said one direction, and means intermediate said lever and said frame for latching the former when said chain is driven in said opposite direction.

6. In a variable speed mechanism for bicycles, the combination with a bicycle frame, a foot operated driving gear mounted thereon, an endless flexible power transmitter operable to be driven thereby in opposite directions, and a movable hub for a propelling wheel rotatably mounted on said frame and including coaster brake means, of a multiple gear adapted to be driven by said transmitter and connected with relation to said hub, said multiple gear comprising a plurality of adjacent cylindrical steps arranged to turn said hub in one direction to propel the bicycle at selectable variable speed ratios when said transmitter is driven in one direction and to actuate said coaster brake means when said transmitter is driven in an opposite direction, spring controlled means for resiliently tensioning said transmitter when the same is driven in said one direction, and latching means adapted to be actuated with relation by said transmitter when the latter is moved in said opposite direction, a portion of said latching means associated with said tensioning means and the other portion of said latching means associated with said frame, whereby said tensioning means will be maintained in position to tension said transmitter.

7. In a variable speed mechanism for bicycles, the combination with a bicycle including a frame, a foot operated driving sprocket wheel thereon, an endless chain operable to be driven thereby in opposite directions, and a movable hub for a propelling wheel mounted on said frame and including coaster brake means, of a multiple gear adapted to be driven by said transmitter and connected with relation to said hub comprising a plurality of coaxially tied driven sprocket wheels of different diameter each for providing variable speed ratios for the bicycle by switching said chain among said driven wheels, said multiple gear arranged to turn said hub in one direction when said chain is driven in one direction thereby propelling said bicycle, and to actuate said coaster brake means when said chain is driven in an opposite direction, a spring pressed movable lever pivotally connected to said frame, an idler sprocket wheel rotatable on said lever and adapted resiliently to tension said chain when it is driven in said one direction, and means intermediate said lever and said frame and operable by said chain for latching the lever when said chain is driven in said opposite direction.

8. In a variable speed mechanism for bicycles, the combination with a bicycle including a frame, a foot operated driving sprocket wheel thereon, an endless chain operable to be driven thereby in opposite directions, and a movable hub for a propelling wheel rotatably mounted on said frame and including coaster brake means, of a multiple gear adapted to be driven by said transmitter and connected with relation to said hub comprising a plurality of adjacent cylindrical steps, each step carrying on its exterior spaced sprockets for operatively engaging said chain when the latter is placed on a step, said multiple gear arranged to turn said hub in one direction to propel the bicycle at selectable variable speed ratios when said transmitter is driven in one direction and to actuate said coaster brake means when said transmitter is driven in an opposite direction, and idler sprocket wheel pivoted with relation to said frame and resiliently held in position for tensioning said chain while the latter is driven in one direction, and a latch adjacent said idler sprocket wheel and in frictional engagement with relation therewith, whereby said latch will be moved into latching engagement with a portion of said frame when said chain is moved in said opposite direction.

9. In a variable speed mechanism for bicycles, the combination with a bicycle including a frame, a foot operated driving sprocket wheel thereon, an endless chain operable to be driven thereby in opposite directions, and a movable hub for a propelling wheel mounted on said frame and including coaster brake means, of a multiple gear adapted to be driven by said transmitter and connected with relation to said hub comprising a plurality of adjacent cylindrical steps, each step carrying on its exterior spaced sprockets for operatively engaging said chain when the latter is placed on a step, said multiple gear arranged to turn said hub in one direction to propel the bicycle at selectable variable speed ratios when said transmitter is driven in one direction and to actuate said coaster brake means when said transmitter is driven in an opposite direction, a projection mounted on said frame near said hub including a toothed rack, a lever having two ends and pivoted with one end to said frame, an idler sprocket wheel pivoted to the other end of said lever, a spring intermediate said frame and said lever adapted to move said idler sprocket wheel to tension said chain, and a latch coaxially pivoted with said idler sprocket wheel on said lever adapted to be frictionally engaged by said idler sprocket wheel and rotatable on said pivot between two extreme positions and so arranged to be moved by said idler sprocket wheel into a latching position with said rack of said projection when said chain is driven in said opposite direction for maintaining said chain substantially rigidly tensioned, and to be unlatched and so maintained when said chain is driven in said one direction for propelling the bicycle.

10. In a variable speed mechanism for bicycles, the combination with a bicycle including a frame, a foot operated driving sprocket wheel thereon, an endless chain operable to be driven thereby in opposite directions, and a movable hub for a propelling wheel mounted on said frame and including coaster brake means, of a multiple gear adapted to be driven by said transmitter and connected with relation to said hub comprising a plurality of coaxially tied driven sprocket wheels of different diameter each for providing variable speed ratios for the bicycle by switching said chain among said driven wheels, said multiple gear arranged to turn said hub in one direction when said transmitter is driven in one direction thereby propelling said bicycle, and to actuate said coaster brake means when said transmitter is driven in an opposite direction, a projection connected to said frame adjacent said multiple wheel having a series of spaced notches corresponding in number to that of the driven sprocket wheels of said multiple gear, a lever pivoted with one end to said frame, an idler gear pivoted to the other end of said lever, a spring intermediate said frame and said lever adapted to move said idler gear to tension said chain, and a latch coaxially pivoted with said idler gear to said lever adapted to be frictionally engaged by said idler gear and rotatable on said pivot between two extreme positions and so arranged as to be moved by said idler gear into a latching engagement with one of said notches of said projection, the selection of a notch determined by the driven wheel selected for engagement with said chain when said chain is driven in said opposite direction for maintaining said chain substantially rigidly tensioned, and to be unlatched and so maintained when said chain is driven in said one direction for propelling the bicycle.

11. In a variable speed mechanism for bicycles, the combination with a bicycle frame, a foot operated driving gear mounted thereon, an endless flexible power transmitter operable to be driven thereby in opposite directions, and a movable hub for a propelling wheel mounted on said frame and including coaster brake means, of a multiple gear adapted to be driven by said transmitter and connected with relation to said hub, arranged to turn the same in a forward and rearward direction to propel said wheel and to actuate said brake means, respectively, and means connected with relation to said frame for tensioning said transmitter when the same is driven in either direction, said means including a sprung idler in contact with said transmitter on the interior thereof and movable in an arcuate path and a releasable latch operable by said idler to maintain the same rigidly at a selected point of said path when said transmitter is driven rearwardly to actuate said brake means and to release said idler when said transmitter is driven forwardly.

12. A shifting mechanism, for use in connection with a variable speed drive for bicycles including a hub, a plurality of driven gears of differing diameter, an idler gear carrying lever opposite said driven gears and movable to positions opposite each driven gear, and a driving chain in contact with said idler gear and shiftable among said driven gears, said shifting mechanism comprising, in combination, a bored stationary shaft supported adjacent said gears and having a slot communicating with said shaft bore, a bushing encircling the exterior of said shaft and reciprocably moving thereon and adapted to support said movable gear carrying lever and to shift the same, a piston disposed in said bore and movable longitudinally therein reciprocably to place said idler gear selectively opposite a driven gear, a finger projecting from said piston through said slot into said bushing for restraining revolving of said bushing and of said piston, and a flexible wire extending from said piston to the exterior of said shaft for manually shifting said piston and thereby said idler gear and said chain.

CEZARY W. LOZINSKI.

REFERENCES CITED

The following references are of record in the file of this patent:

UNITED STATES PATENTS

| Number | Name | Date |
| --- | --- | --- |
| 2,010,248 | Winkler | Aug. 6, 1935 |
| 2,099,477 | Gruyer | Nov. 16, 1937 |
| 2,108,941 | Morgan | Feb. 22, 1938 |
| 2,199,331 | Carlsson | Apr. 30, 1940 |